July 7, 1970

A. A. MULLINS 3,519,075

FORMATION TESTER

Filed Feb. 26, 1968

INVENTOR.
ALBERT A. MULLINS

BY
Brumbaugh, Free, Graves & Donohue
his ATTORNEYS

INVENTOR.
ALBERT A. MULLINS
BY
his ATTORNEYS

FIG. 8

INVENTOR.
ALBERT A. MULLINS 3,519,075
FORMATION TESTER
Albert A. Mullins, Rosenburg, Tex., assignor to Schlumberger Technology Corporation, Houston, Tex., a corporation of Texas
Filed Feb. 26, 1968, Ser. No. 708,246
Int. Cl. E21b 49/00
U.S. Cl. 166—150                                                    13 Claims

ABSTRACT OF THE DISCLOSURE

Apparatus for drill stem testing in a well bore is described. The tool string includes a packer, a hydrostatic bias tool, a bypass valve, and a tester valve connected in tandem, the latter being coupled to a pipe string extending to the surface. The tester valve for admitting well fluid to the pipe string and obtaining samples, includes inner and outer members having valve means arranged whereby a sequence of vertical movements of the pipe string operates the valve means according to a preset pattern. The tester valve is provided with a delay opposing opening movement of the valve, at the termination of which delay the bias tool is actuated. The sequential, rather than concurrent, operation of the tester delay and hydrostatic bias makes the tool string particularly advantageous when used in cased or open well bores where high frictional resistance to movement of the pipe string may be expected.

---

The present invention relates to well tools for formation testing, and more particularly to apparatus for conducting drill stem tests in a well bore.

As an aid in determining the nature of fluids in the formation surrounding a well bore drilled into the earth, and thereby establish the presence or absence of hydrocarbon fluids, various forms of drill stem testing apparatus have been devised for extracting samples of formation fluid and bringing them to the surface as well as providing fluid pressure measurement in the well bore. Typically, these tools include a number of separate components connected in tandem to form a tool string. The tool string is lowered into the well bore at the end of a string of pipe that also serves as a conduit through which formation fluids may be brought to the surface. When the tool string reaches the desired depth, manipulation of the pipe string effects a series of operations by the tool components as a result of which the desired fluid sample is extracted and pressure measurements are made.

Basically, such tool strings usually include a packer for isolating a well zone to be tested, pressure recorders for recording pressures in the isolated zone, and a tester valve, actuation of which enables the withdrawal of the desired fluid sample. A bypass valve is used to enable easier running and retrieving of the tools and for equalizing pressures when a test has been completed. Certain auxiliary equipment such as safety joints and jars can also be used.

As described in U.S. Pats. Nos. 3,308,882 to Lebourg and 3,329,209 to Kisling, both assigned to the present assignee, operation of the several components of the foregoing type of tool string is effected from the surface by various manipulations of the pipe string. Since the pipe string is composed of a number of lengths of pipe held together by threaded collars, it will be appreciated that only a limited amount of rotational motion of the pipe string should be employed because there may not be exact correspondence between the extent of rotation at the tools and the rotation applied to the pipe string at the surface. Moreover, any great extent of left-hand rotation should be avoided, otherwise, sections of the pipe string may become uncoupled. Consequently, the bulk of the tool operations are initiated by vertical motion imparted to the tool string by controlled up and down movement of the pipe string from the surface. The various components of the tool string include telescoping elements relatively slidable into one another for opening and closing valves, etc. Examples of such elements are shown in the aforementioned patents.

The precise control of valves and other mechanisms in a tool string suspended in a well bore many feet below the surface by manipulation of a pipe string from the surface, presents some difficulties. The opening and closing of a valve in the tool may require a relative movement of but several inches between the respective elements and it is virtually impossible to control the lifting or lowering of a long heavy pipe string in such small increments without accurate control mechanisms. One suitable arrangement for this purpose takes the form of an index slot and index pin combination, whereby the two telescoping members of a tester valve, for example, are coupled, the index slot being formed on one of the elements and the pin being carried by the other. These index slots or J slots as they are sometimes referred to, are so arranged that a succession of up and down movements of the pipe string results in a motion between the telescoping elements of preselected distances in a prescribed sequence. It is thus unnecessary at the surface to control the length of movement of the pipe string except in a general manner; it being required only to lift it and lower it a predetermined number of times to complete a full cycle of operations. Different forms of such index slot arrangements are shown in the patents noted above.

Of course, the well zone must be isolated before the tester valve is opened and must remain isolated until the test is completed. Inasmuch as the valves are operated mainly by vertical motion of the pipe string, it has become conventional practice to use various forms of delay or retarding means to prevent opening of the tester valve before the packer has seated and the bypass has closed. The delay means provides a resisting force to downward movement of the pipe string. Moreover, the packer should remain seated and the bypass closed during further manipulations of the pipe string to repeatedly open and close the tester valve if desired.

One method of accomplishing this is through use of what may be commonly called a "bias tool" which employs the hydrostatic pressure of the well fluids to provide a downward force on the bypass and packer during upward movement of the pipe string. Additionally, the bias tool provides an upward force on the pipe string which is beneficial because this force reduces the total upward force which must be applied to the pipe at the surface to manipulate the tools. However, this upward force also resists downward movement of the pipe string when it is lowered in order to open the tester valve.

Prior art tool strings employing hydrostatic bias tools and delay means in the tester valve have been so arranged that upon lowering of the pipe string, the resistances afforded by both the bias tool and the delay means are simultaneously exerted. In a well bore whose diameter is not substantially greater than that of the pipe string, this arrangement presents no difficulties except in highly deviated conditions. However, in a well bore having a diameter significantly greater than that of the pipe string, difficulties in applying sufficient pipe weight to the tool string to open the tester valve may be encountered because of pipe friction against the well bore wall. Such difficulties are even further magnified in deviated bore conditions. These factors may supply sufficient additional resistance to lowering of the pipe string such that, when combined with the hydrostatic bias and delay means, it may be either impossible to open the valves in the tool or may take an unduly lengthy time to operate the tools. Either of these occurrences is, of course, undesirable.

Accordingly, it is the primary object of the present invention to provide, in a tool string of the type described, an arrangement of tool components such that difficulties in applying sufficient pipe weight to the tools in order to operate them are overcome.

Another object of the present invention is to provide an improved tester valve-hydrostatic bias tool combination for effecting sequential rather than simultaneous retardation of the downward motion of the pipe string so that the tool components can not simultaneously aid friction forces against the pipe string in resisting downward movement of the pipe string.

Yet a further object of the present invention is to provide a new and improved bias tool so arranged that high pressure differentials will not cause binding of parts with consequent difficulties in operating the tool.

The foregoing and other objects, features and advantages of the invention will become more apparent from the following detailed description thereof, when taken in conjunction with the accompanying drawings, in which.

Figures 1A, 1B:
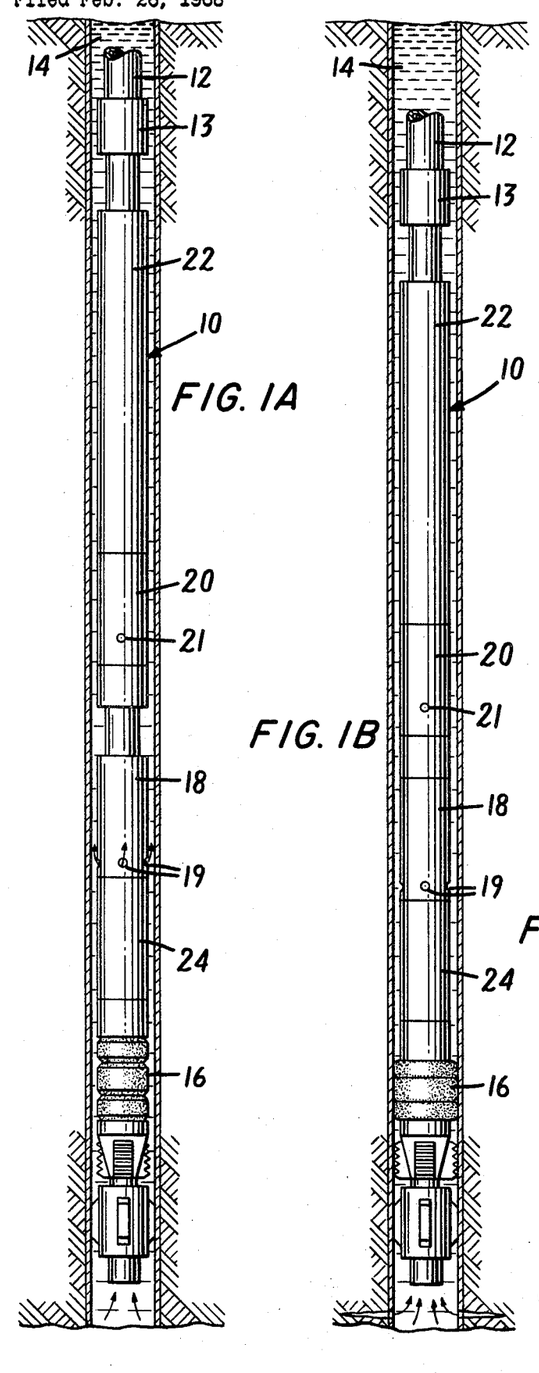
FIGS. 1A, 1B and 1C are views in partial section of a complete well tool according to the inevntion at different stages of operation in a well bore.
Figure 1C:
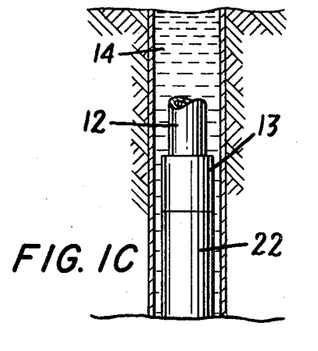

FIGS. 1A, B, and C show the overall tool string of the invention in various stages of its positioning and use in a cased well bore. However, it will be appreciated that the principles of the present invention are equally applicable to tools used in open hole testing. The tool string 10 is coupled at its upper end by an appropriate collar 13 to a pipe string 12 and lowered through the fluid filled borehole 14. The tool string is shown in FIG. 1A in the condition it assumes during lowering to the preselected level at which the fluid sample is to be taken.

As shown, the tool string includes a packer 16, such as of the full bore type disclosed in Pat. No. 3,329,209, a bypass valve 18, a bias tool 20, and a tester valve 22. The packer may be coupled to the bypass valve by means of a safety joint 24 such as described in Pat. No. 2,708,-100, assigned to the present assignee.

During the downward travel of the tool string 10 through the well bore, the packer 16 is in its retracted condition, the bypass valve 18 is open, and the tester valve 22 is closed. A hollow axial passage is provided through the packer and safety joint into the bypass valve 18, as shown in Pat. No. 3,329,209 and with the bypass valve 18 open, the fluid may flow axially through the elements 16 and 24 and out of the peripheral openings 19 in the valve 18. The tool string then may be readily lowered to the prescribed depth.

When the tool reaches the desired depth, the packer 16 is set to anchor the tool string to the well conduit wall and the bypass valve 18 is closed, thereby isolating the well zone below the packer 16 from well fluids in the annulus above the packer. As described in the Kisling patent noted above, the packer 16 includes an expansible ring element of elastomeric material which upon axial compression expands to fill up the well bore and seal it against passage of fluid. The packer also includes a number of gripping elements, called slips, which at the same time are expanded into gripping relationship to the well casing wall to resist further downward movement.

The packer 16 is set, or expanded into contact with the casing by exerting a clockwise torque through a fraction of a turn and then a downward force by lowering the pipe string. The latter causes the slips to grip the wall of the casing, resisting further downward movement. Continued lowering of the pipe string expands the elastomeric packer elements into fluid-tight engagement with the well casing wall. A more detailed expanation of the construction and operation of the packer element may be found in the aforementioned Pat. No. 3,329,209.

With the packer set and the bypass valve 18 closed, the tool string is shown in FIG. 1B. Further lowering of the pipe string opens the tester valve 22, as illustrated in FIG. 1C. At this time, further raising and lowering of the pipe string and the resultant actuation of the tester valve will be controlled in accordance with the index slot and index pin structure to be described.

Figure 2A:
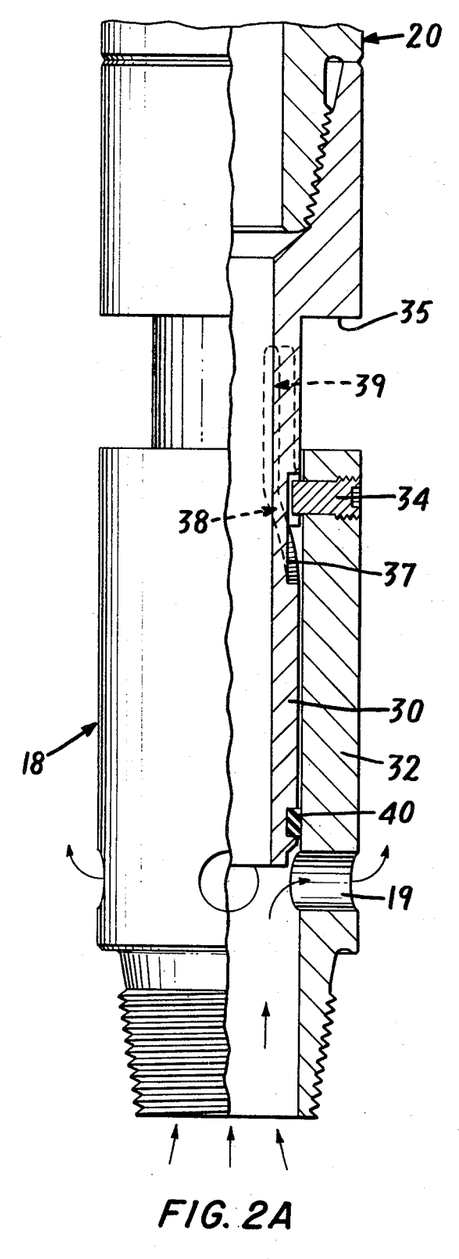
FIGS. 2A and 2B are partial cross-sectional views of a bypass valve assembly for use with the invention, in open and closed position, respectively.
Figure 2B:
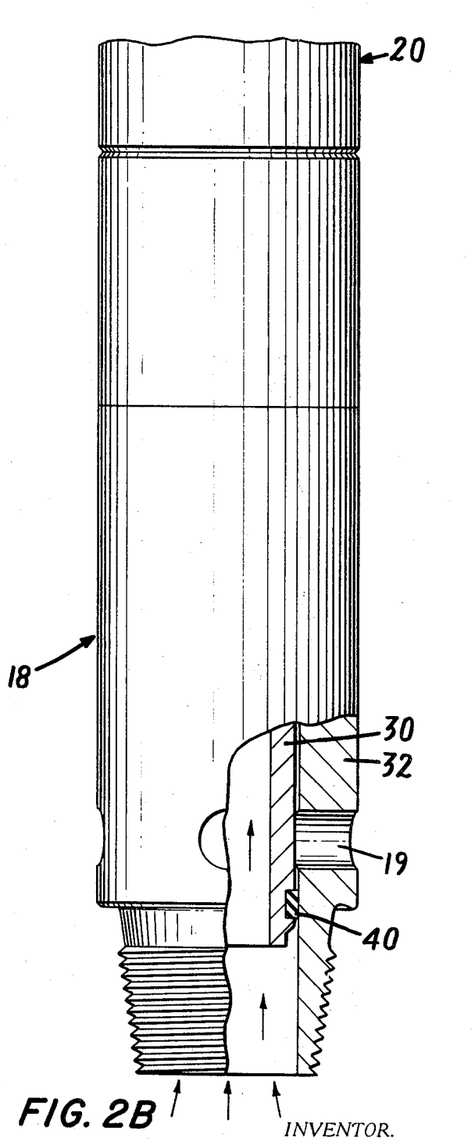

A suitable form of bypass valve 18 is shown in FIGS. 2A and 2B. The valve includes a tubular mandrel 30 telescopically received within a tubular housing 32, these elements being provided at their upper and lower ends, respectively, with threaded connections for coupling to the adjacent components of the tool string. A lug 34 on the housing 32 engages in a J slot 36 in the mandrel 30 to control relative movement. In the extended position of the mandrel 30 shown in FIG. 2A, ports 19 through the housing wall are open to fluid flow, and the mandrel is held in extended position by engagement of the lug 34 within a slot portion 37. By elevating the mandrel slightly and then holding right-hand torque, the mandrel can be lowered with respect to the housing to its closed or contracted position, the lug 34 traversing an inclined slot portion 38 and entering an elongated vertical portion 39. When a shoulder 35 on the mandrel bears against the upper end of the housing, thereby preventing further movement, an annular sealing element 40 on the lower end of the mandrel 30 forms a fluid-tight sliding seal with the inner wall of the housing 32 to close off the ports 19 as shown in FIG. 2B.

Figures 3A, 3B, 3C:
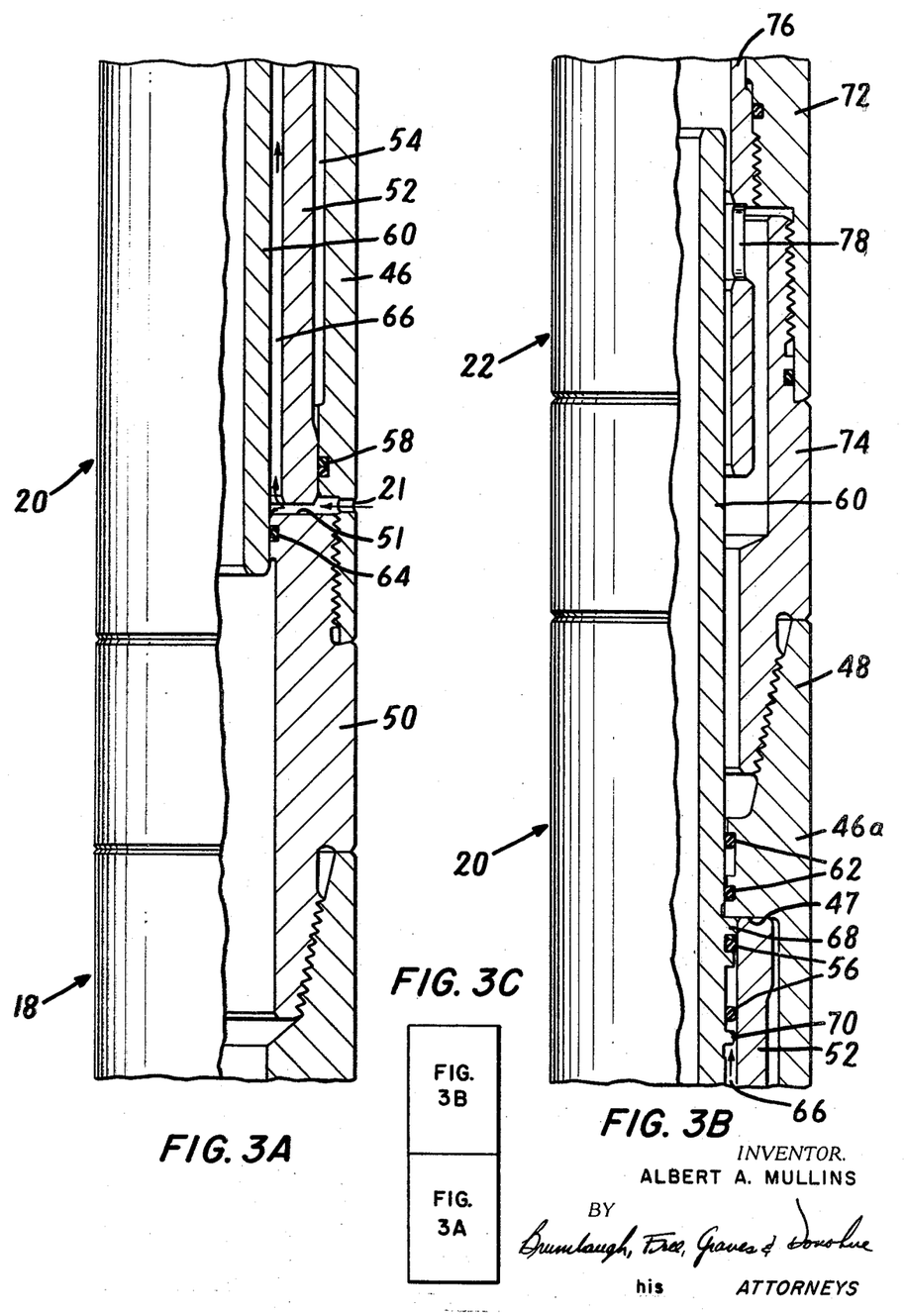
FIGS. 3A and 3B taken together as in FIG. 3C, illustrate in partial cross-section the hydrostatic bias tool of the invention in its extended position.

The hydrostatic bias tool 20 is illustrated in FIGS. 3A and 3B, viewed as indicated in FIG. 3C. The relative positions of the elements of the tool are shown as they would be under the conditions of FIG. 1A.

The bias tool includes an outer cylindrical housing 46 having a small internal diameter portion 46A at its upper end to form an internal shoulder 47. The upper end of the housing is also provided with an internally threaded portion 48 for coupling to the tester valve 22. The housing extension section 50 is threadedly coupled to the bottom portion of the housing 46 and includes at its lower end an externally threaded portion for coupling to the bypass valve 18.

An inner sleeve 52 is retained within the housing 46 to form a chamber 54. The chamber is sealed at reduced or atmospheric pressure by means of sealing rings 56, 58, and 62 adjacent the upper and lower ends, respectively, of the sleeve 52.

A hollow mandrel 60 is slidably received within the housing 46 and housing extension 50 and sealed thereto in fluid-tight relationship by O-ring sealing means 62, 64. The outer diameter of the mandrel 60 is smaller than the internal diameter of the sleeve 52, leaving an annular passage 66 therebetween. The latter is communicated with the well annulus by the port 21.

The mandrel 60 has an enlarged piston section 68 sealingly slidable on the inner wall of the sleeve 52. As shown in FIG. 3B, in the extended position of the bias tool, the piston section 68 bears upwardly against the internal shoulder 47 of the housing. Additional sealing means 56, such as a pair of rubber O-rings, are carried in an annular groove formed in the piston section.

As will be understood, the hydrostatic pressure of well fluids can act upwardly against an annular pressure area presented by the difference in seal areas of the seals 62 and 56, or in other words the area of the piston section 68. This pressure tends to move the mandrel 60 upwardly. At the same time, the annulus pressure is acting downwardly against a like area on the housing section 46a, thereby tending to force the housing, as well as any components coupled to it, downwardly in the well bore. In order to move the mandrel 60 downwardly with respect to the housing, the force applied to the mandrel must exceed that resulting from the hydrostatic pressure exerted upwardly on the aforementioned differential area. On the other hand, when downward pressure on the mandrel is released, the hydrostatic pressure in the chamber 66 will tend to move the mandrel back to its extended position without requiring a positive lifting force on the mandrel. As will become apparent hereinafter, this assists the operation of the tester valve by reducing the weight of pipe which must be lifted in order to close the tester valve.

Figures 4, 5A, 5E:
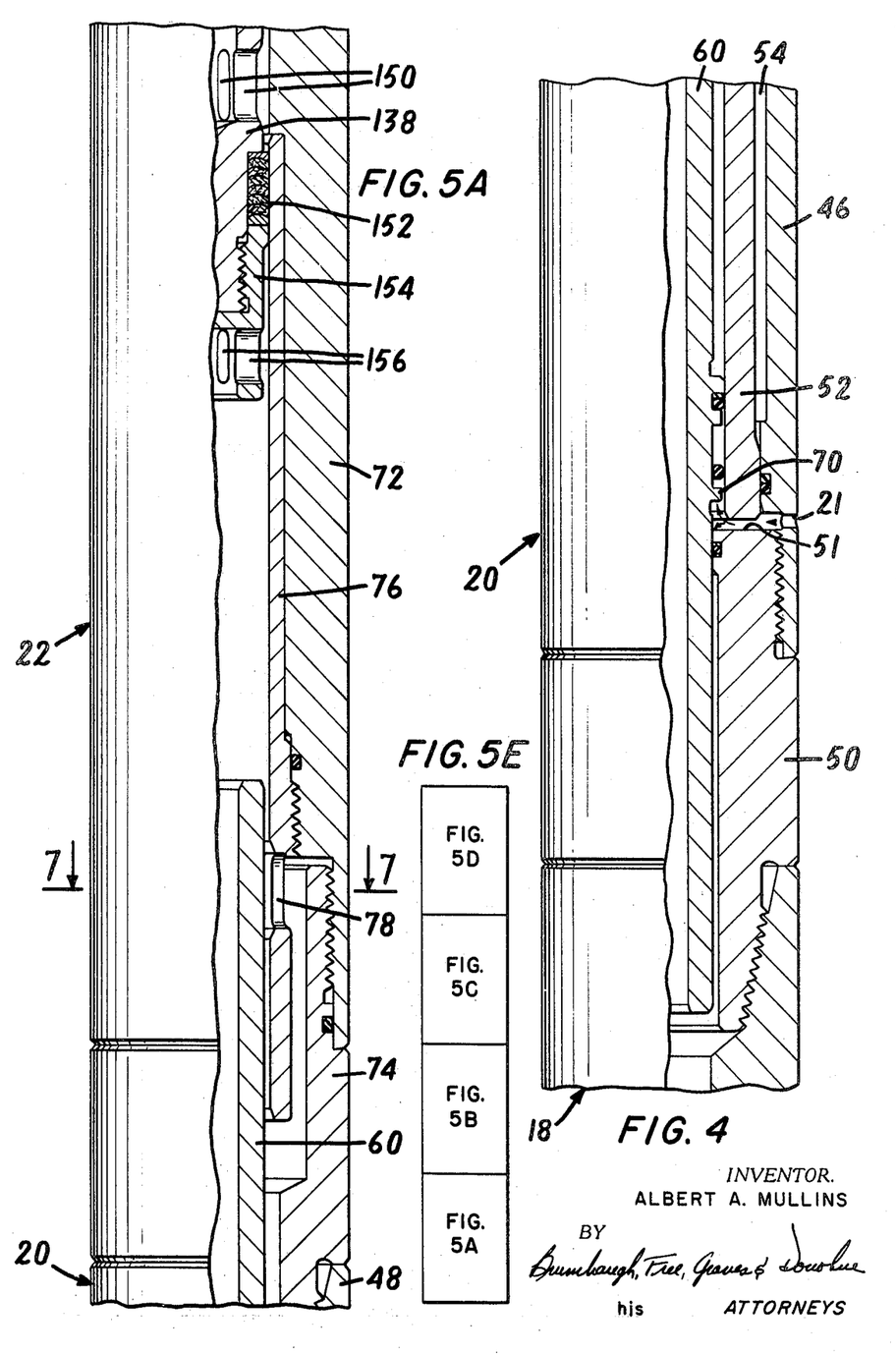
FIG. 4 illustrates a portion of the bias tool of FIGS. 3A and 3B in the contracted position.
FIGS. 5A to 5D, taken together as in FIG. 5E, are a partial cross-sectional view of the tester valve assembly of the invention, in its normally closed position.

FIG. 4 shows the lower portion of the bias tool 20 when the mandrel 60 has been pushed downwardly to its contracted position upon lowering of the pipe string. As explained above, the force necessary to move the mandrel from the position shown in FIG. 3B to the position shown in FIG. 4 was sufficient to overcome the hydrostatic pressure force exerted against the piston section 68.

It should be noted that the outer wall surface of the sleeve 52 is laterally spaced from the inner wall surface of the housing member 46. This arrangement will prevent high annulus pressures acting on the housing 46 from causing the sleeve 52 to bind against the piston section 68 of the mandrel 60. Thus the mandrel 60 may be easily reciprocated relative to the housing member 46 under all hydrostatic pressure conditions.

The tester valve assembly 22 is shown in FIGS. 5A, B, C and D, arranged as illustrated in FIG. 5E. The valve assembly includes a housing section 72 of generally cylindrical shape having a coupling extension 74 threadedly engaging the lower end for connection to the threaded section 48 of the bias tool 20. Secured to the inner wall of the housing section 72 is a sleeve 76 which extends downwardly into the internal bore of the coupling extension 74. As seen in FIG. 5A, the outer diameter of the portion of the sleeve 76 extending within the coupling extension 74 is smaller than the internal diameter of the latter, leaving an annular flow passage between the two members. The internal diameter of the sleeve 76 is made sufficiently large to accommodate the mandrel 60 of the bias tool with substantial clearance.

The lower portion of the sleeve 76 extending within the coupling extension 74 includes a plurality of angularly spaced openings or ports 78 which form part of the path for ingress of fluid to the tester valve, as well as described hereinafter. The arrangement of the ports 78 is shown more clearly in the cross-sectional view of FIG. 7.

The housing section 72 is extended upwardly to form the outer sleeve of the tester valve by means of sections 80 (FIG. 5B), 82 (FIGS. 5B and 5C) and 84 (FIGS. 5C and 5D), all of which are threadedly fastened together as shown. Within the sleeve 76, the tester valve mandrel 90 (FIG. 5D) is arranged to move longitudinally in both directions in telescopic fashion. As shown in FIG. 5D, the upper end of the tester valve mandrel, indicated generally by the numeral 90, is connected by means of the threaded collar 13 to the lower end of the pipe string 12.

Proceeding downwardly along the tester valve, the upper end of the mandrel 90 includes a spline 102 engaging a complementary longitudinal spline groove 104 formed on the inner wall of the housing section 84 (FIG. 5D). As seen in the figure, the upper end of the housing section 84 is provided with a flanged end 85 carrying an O-ring to effect a slidable fluid-barrier with the mandrel 90. The flange 85 also functions as a limit stop for upward movement of the mandrel 90, in association with the top of the spline 102. The ultimate stop for downward travel of the mandrel 90 is provided by engagement of the collar 13 with the upper end of the housing section 84, while an intermediate stop limit is provided by lugs 106 on the mandrel as will be more fully described.

The index or J slot 111 discussed above is formed, such as by milling, on the outer surface 110 of the mandrel 90. As will be explained more fully in connection with FIG. 6, the index slot is formed of a number of interconnected grooves. The slot 111 is cooperable with a lug 120 mounted on a rotatable sleeve 122, the various portions of the slot being arranged with respect to each other such that preselected amounts of vertical movements of the mandrel 90 relative to the housing section 84 will cause a sequence of turning or indexing motions of the sleeve 122.

The index pin 120 is fastened to the sleeve member 122 supported within the housing section 84 in such fashion as to be freely rotatable about the axis of the housing. However, thrust washer assemblies 124, 126 secure the sleeve 122 against vertical motion within the housing section. Consequently, as the mandrel is moved up and down by raising and lowering the pipe string, the pin 120 and the sleeve 122 follow all of the lateral components of motion forced by the cam action of the slot. The sleeve 122 has inwardly extending lugs or abutments 123 which are indexed by turning of the sleeve in such a manner that the lugs are angularly positioned to be engaged by the mandrel lugs 106 when the pin 120 is in one portion of the slot 111, and are angularly positioned when the pin is in other portions of the slot to permit the lugs 106 to pass downwardly and upwardly through spaces between the lugs 123.

Figures 5B, 7, 9:
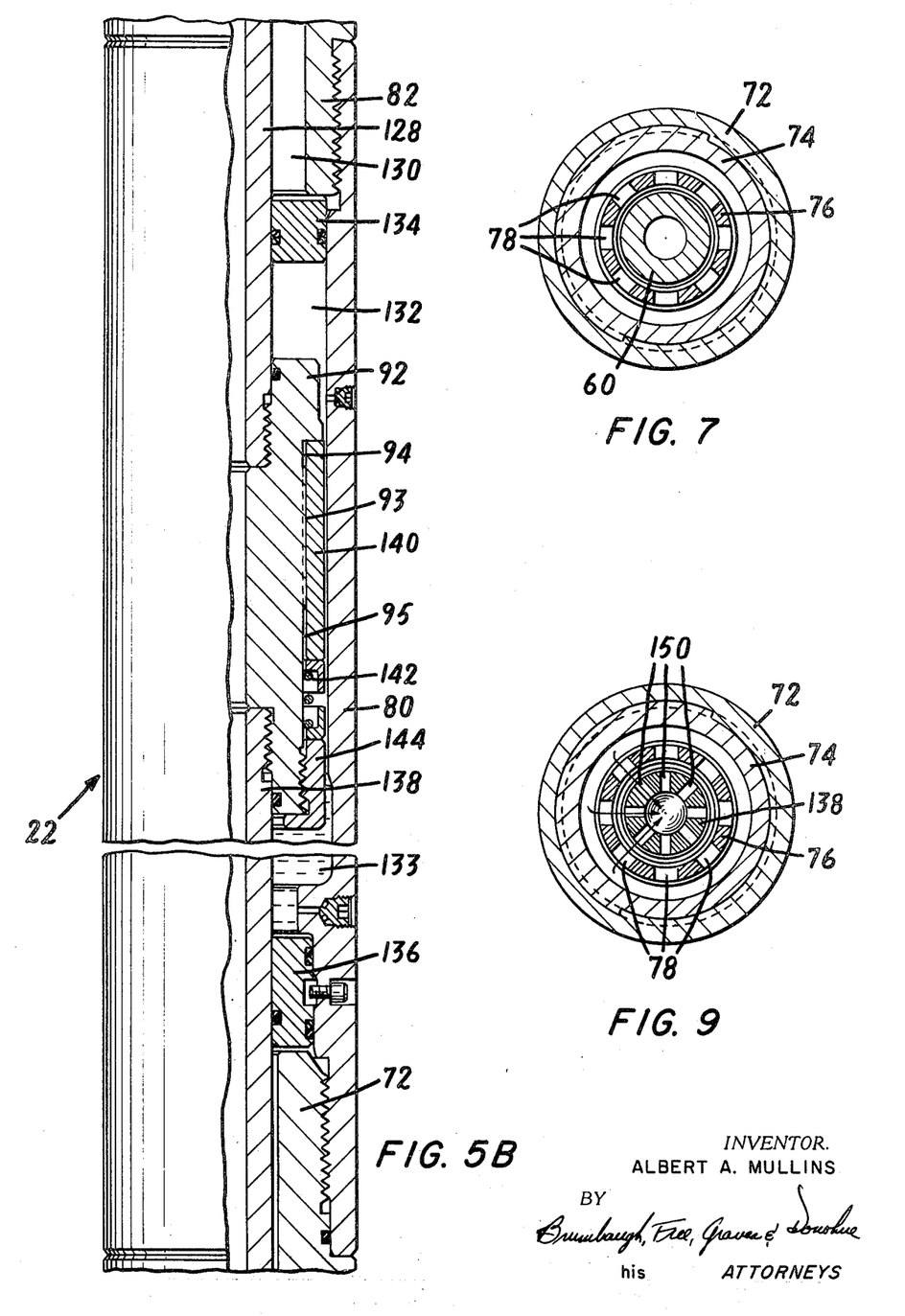
FIG. 7 is a section through the tester valve taken at lines 7—7 of FIG. 5A.
FIG. 9 is a section through the tester valve taken at lines 9—9 of FIG. 8.
Figures 5C, 5D:
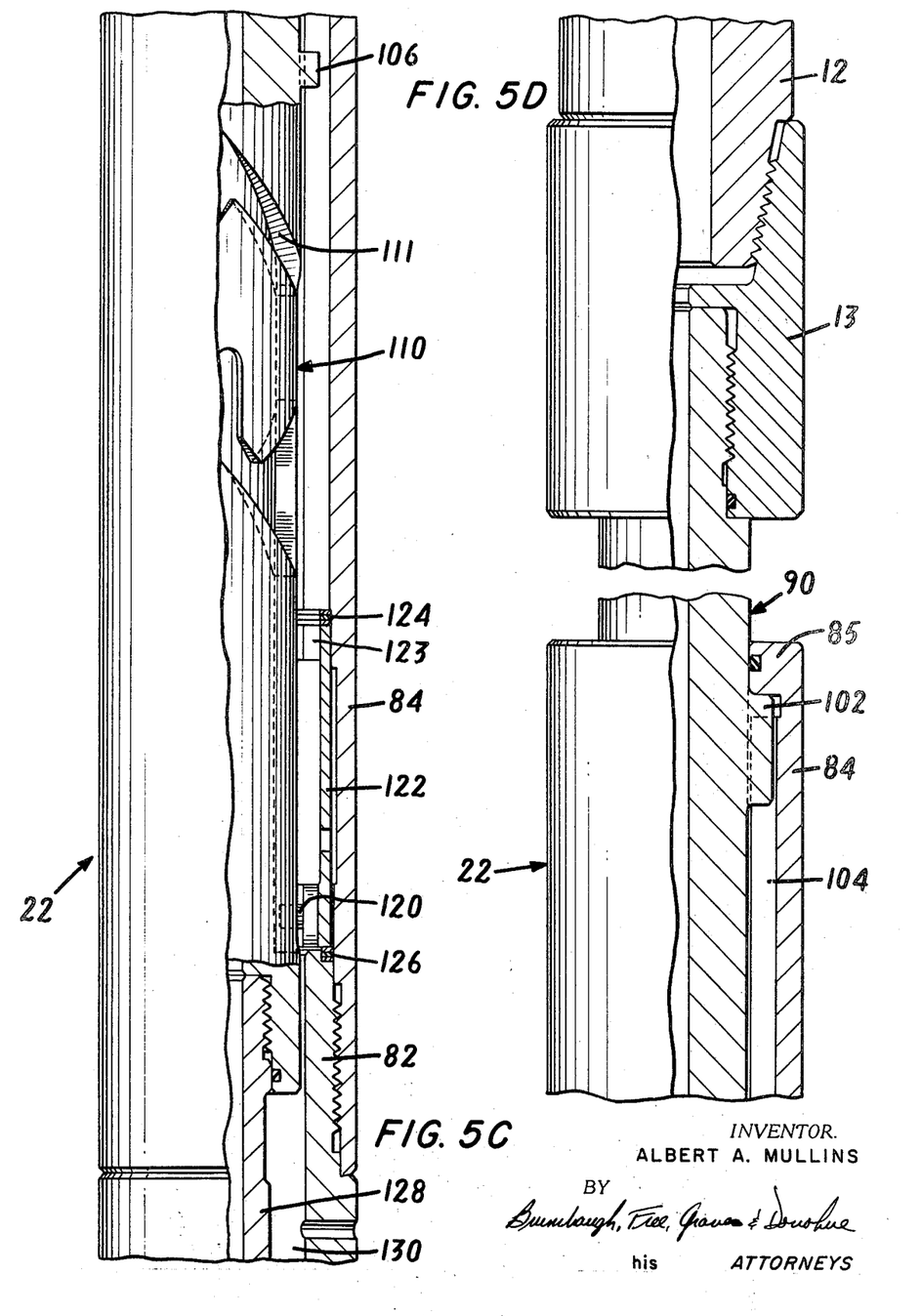

The mandrel 90 extends below the index slot portion 110, such as by means of a threaded extension 128, to form an annular chamber 130 between the mandrel and the housing section 82 (FIGS. 5B and 5C). The chamber 130 is closed at its upper end by the O-ring in the flange 85 (FIG. 5D) which acts as a barrier to the entry of foreign matter into the chamber from above. If desired, the chamber 130 can be filled with a suitable lubricating fluid.

The tester valve assembly includes delay means for retarding or resisting downward movement of the mandrel 90 with respect to the outer housing. The delay means includes (FIG. 5B) an oil chamber 132 formed between the housing section 80 and the mandrel 90, sealed at its upper end by balance piston 134 and at its lower end by a piston 136. Between the pistons, the mandrel 90 has a portion 92 of increased diameter, which conveniently may be a separate section threadedly fastened between the mandrel sections 128 and 138. Around the periphery of the mandrel section 92 is carried an annular sleeve 140 whose thickness is slightly less than the radial clearance between the section 92 and the inner wall of the housing section 80. The sleeve 140 is allowed limited axial motion along the mandrel portion 92 but is normally urged to its uppermost position against a retaining shoulder by means of a compression spring assembly 142 maintained under compression around the lower end of the mandrel portion 92 by the cup member 144. The outer wall of the mandrel section 92 is provided with a plurality of angularly spaced vertical grooves 93 extending between upper and lower reduced diameter portions 94 and 95 respectively.

When the pipe string weight is applied to the upper end of the tester valve mandrel 90 to move the latter element downwardly, the delay sleeve 140 is urged against the shoulder in the mandrel section 92 preventing oil from flowing upwardly through the grooves 93. This leaves only a restricted flow path for fluids flowing from the lower portion of the chamber 132 to the upper portion (through the annular space between the sleeve 140 and the inner wall of the housing section 80), thereby resisting or delaying downward motion of the mandrel relative to the housing.

When the sleeve 140 reaches the enlarged lower portion 133 of the chamber, which is shown foreshortened in FIG. 5B for ease of illustration, the increased clearance between the sleeve 140 and the housing section 80 allows relatively unrestricted flow of oil past the piston into the upper portion of the chamber 132. Thus the delay or restriction to downward motion occurs only over a fixed length of the downward travel of the mandrel.

When the mandrel is raised, the sleeve 140 is urged against the spring assembly 142, displacing it from the shoulder on the mandrel section 92. This allows relatively free fluid flow through the grooves 93 and into the lower chamber 133, thereby offering little impedance to movement of the mandrel in the upward direction. It will be seen therefore, that the delay sleeve arrangement provides a resistance or retardation to downward movement of the tester valve mandrel for a predetermined distance of such downward travel and provides substantially no resistance to upward movement at any point along its upward path of travel.

Returning to FIG. 5A, the lower end of the mandrel section 138 is shown. The lower extremity of the latter mandrel portion is solid, closing off the otherwise continuous axial fluid passage through the tester valve assembly. Immediately above the termination of the bore are provided a plurality of ports 150 angularly spaced about the mandrel section. The lower end of the mandrel section 138 is slidably engaged within the sleeve 76 by a fluid-tight sealing element 152 retained in position by means of a threaded extension 154 fastened to the end of the mandrel 138. The latter can include a downwardly extending tubular section having a plurality of ports 156 angularly spaced about its circumference.

Figure 8:
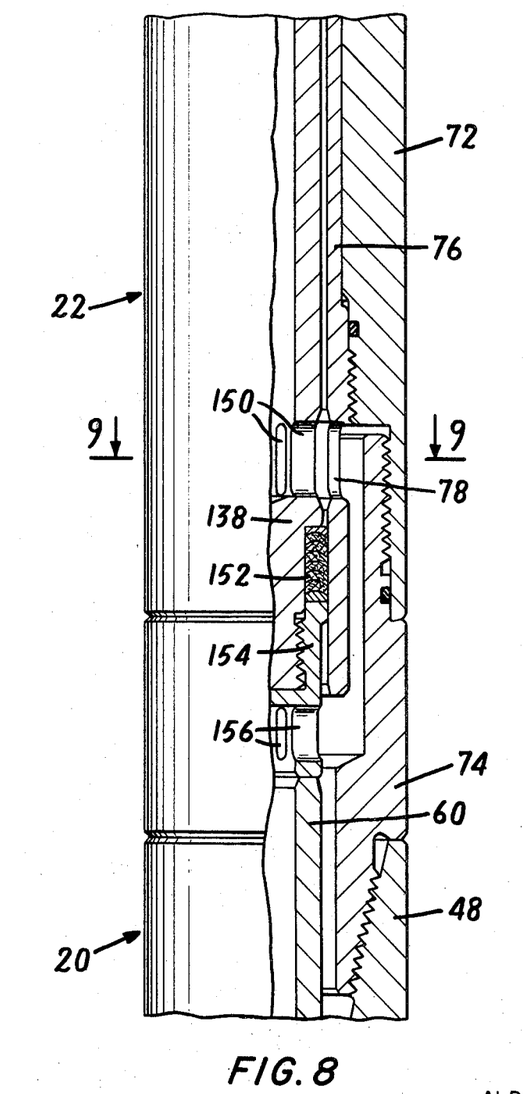
FIG. 8 is a view, in partial cross-section, of the lower portion of the tester valve assembly showing the valve in its open condition.

In the position shown in FIG. 5A, it will be seen that the tester valve is in its closed condition when the mandrel 90 is in its upper or extended position, such as indicated in FIGS. 1A and 1B. FIG. 8 includes generally the same elements shown in FIG. 5A, but with the relationship of parts established when the valve is opened to fluid flow, i.e. when the mandrel 90 is in its lower or contracted position (FIG. 1C) with the collar 13 engaging the upper end of the housing section 84. As seen in FIG. 8 and in the cross-sectional view of FIG. 9, when the valve is opened by depressing or lowering the mandrel section 90, the mandrel extension pushes the mandrel 60 of the bias tool downwardly and aligns the ports 150 on the tester valve mandrel with the ports 78 on the inner sleeve 76 of the valve. At the same time, fluid flow up through the bore in the bias tool mandrel finds an open fluid path through the ports 156 and into the hollow tester valve mandrel through the now aligned ports 78, 150. Thus, in the open tester valve condition, fluid from the well below the packer 16 is free to flow upwardly through the tool into the valve and thence upwardly into the pipe string 12.

Figure 6:
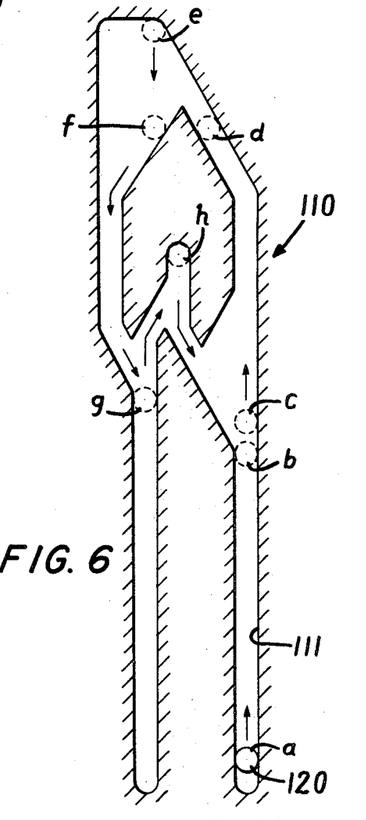
FIG. 6 is a flattened representation of the J or index slot in the tester valve.

The operation of the tool string can best be explained with reference to FIG. 6 which is a flattened out representation of the index slot 111 on the tester valve mandrel portion 110 shown in FIG. 5C. While the tool is being run in or lowered into the well, the index pin 120 is at the position $a$ in the index slot 110. When the desired depth in the well is reached, the packer is set and the bypass valve closed by picking up slightly, then torquing the pipe string to the right and slacking off, the weight of the pipe string being applied to the upper end of the tool string and causing the bypass valve members to telescope to contracted positions wherein the ports 19 are closed. The packing rings 16 are expanded as shown in FIG. 1B, and the well bore zone below the packer is isolated.

As further pipe weight is applied, the tester mandrel 90 begins to move downwardly against the retarding action of the hydraulic delay system. The index pin 120 rides up, relatively speaking, in the index slot and the sleeve 122 remains angularly fixed for the time being. When the pin 120 reaches point $b$ on the slot, the delay sleeve 140 has reached the relief section 133 of the delay chamber, terminating that resistance to downward movement.

A small additional amount of downward movement of the mandrel 90, to point $c$, brings its lower extension 154 into contact with the upper end of the bias tool mandrel 60. Thereafter the mandrel 90 pushes the bias mandrel 60 downwardly for the remainder of its permissible downward stroke, the annulus pressures acting on the piston section 68 to provide an upward lifting force on the tester mandrel. It will be seen therefore, that between the extended or closed position of the tester valve and its open or contracted position, resistances to downward movement are afforded sequentially and not simultaneously. The first of these is produced in the tester valve itself; the second is furnished by the bias tool in response to hydrostatic pressure of the well bore fluid. It will thus be appreciated that the tester delay and the bias tool can not simultaneously aid the friction forces between the pipe string and the casing. Therefore, more pipe weight is available at the tools to operate them.

When the pin 120 engages the inclined wall of the upper portion of the slot near position $d$, the sleeve 122 indexes to permit the mandrel lugs 106 to pass between the sleeve lugs 123. At approximately position $d$, the ports 150, 156 and 78 begin to draw into alignment to establish the fluid flow path through the tester valve. When the mandrel has been lowered to the point where the collar 13 engages the housing section 84 and the index pin reaches point $e$ in the slot, these ports are aligned for full fluid flow. This is a condition shown in FIG. 1C and FIG. 8. The apparatus may be retained in this condition for as long as a fluid flow period is desired.

To obtain an indication of the shut-in pressure, the pipe string is raised to move the pin past point $f$ in the slot, at which point the sleeve 122 again indexes, the lugs 106 pass between lugs 123 and the tester valve closes to prevent fluid flow therethrough, to the point $g$ along the left-hand vertical arm of the index slot. Subsequent lowering of the pipe string indexes the sleeve 122 to an angular position wherein the sleeve lugs 123 are vertically aligned with the mandrel lugs 106. When the pin reaches position $h$, the shut-in position, the lugs 106 and 123 engage at which point the valve remains closed and the pressure reading may be taken with the weight of the pipe string slacked off on the tool string.

When it is desired to retrieve the tool string, the pipe string is lifted and the pin rides down in the slot, back through position $b$ and eventually to position $a$. As discussed above, during this return motion, no resistance is provided by the tester valve delay and the bias tool operation assists in raising the pipe string. Of course, the tester can be recycled as many times as desired for multiple flow and shut-in pressure measurements.

As described in the aforementioned patents, further raising of the pipe string opens the bypass valve 18 and releases the packer 16, allowing the pipe string and the tool string to be readily lifted out of the well bore. The tester valve retains some of the well fluid in its now closed axial flow path, allowing surface analysis to determine its composition. Alternatively, a sample trapping chamber can be incorporated in the tester valve assembly in the manner taught by the Lebourg Pat. No. 3,329,209.

It will be seen, therefore, that the present invention represents a significant advance over prior art arrangements of the same general type, especially where difficulties in getting sufficient pipe weight to the tools has been encountered. The sequential, rather than simultaneous, resistance to downward movement of the pipe string obtained with the construction described herein, reduces the total downward force required at any point in time to operate the tester valve. This in turn enables expeditious testing procedures even when frictional forces encountered tend to offer high resistance to downward movement of the pipe string and where in the past the combined effect of the friction, hydraulic delay, and bias force may have made it impossible to even operate the tester valve.

Although a particular tool string assembly utilizing the invention has been described for purposes of illustration, it will be apparent that various modifications of the several portions of the apparatus will occur to those skilled in the art and that such variations in detail may be made without departing from the spirit of the invention.

I claim:

1. In a well tool adapted for use in a fluid-filled well bore, normally closed valve means for selectively admitting fluid in the well to an interior portion of said tool, said valve means being opened by longitudinal movement of a member to a valve-opening position thereof, and first and second sequentially operable means opposing said longitudinal movement of the member to said valve-opening position, said second opposing means being responsive to hydrostatic pressure of the fluid in the well bore to retard movement of the member to such valve-opening position.

2. A well tool according to claim 1 wherein the second opposing means includes inner and outer telescoping members having coengageable means providing sealed low pressure chamber, said chamber having longitudinal wall surfaces spaced from one another, one of said members having a piston section; and means to enable fluid pressure to act on said piston section, whereby a pressure differential between the fluid pressure and the chamber pressure can exert force on said members.

3. A well tool according to claim 1 wherein the said second opposing means includes an outer member having end portions adapted for connection in a string of tools; a mandrel telescopically movable in said outer member and having a piston section; a sleeve intermediate said outer member and said mandrel and laterally spaced from said outer member, said piston section being sealingly slidable on said sleeve, means to enable fluid pressure to act on said piston section; and means providing a sealed low pressure chamber between said piston section and sleeve and said outer member.

4. Apparatus according to claim 1 wherein said valve means comprises a pair of elongated telescoping members longitudinally movable relative to one another between closed and open positions, one of said members being responsive to downward force thereon to move downwardly from the closed position to the open position of the valve, the other of said members being fixed relative to the well bore, said first opposing means being operable over the initial portion of the downward movement of said one member from the closed toward the open valve position, and said second opposing means being operable over the final portion of said downward movement.

5. Apparatus according to claim 4 wherein said first opposing means provides substantially no resistance to upward movement of said one of said members from its open to closed valve position.

6. Apparatus according to claim 5 wherein said second opposing means assists in returning said one of said members toward its closed valve position.

7. Apparatus for use in testing earth formations comprising: normally closed valve means movable to open position in response to the weight of a pipe string; first means for yieldably resisting movement of said valve means toward open position over a first portion of the opening movement, said first means thereafter being inactive; and second means for exerting force on said valve means over a second portion of the opening movement in a direction tending to return said valve means to its normally closed condition, said second means being inactive during the said first portion of the opening movement, thereby to minimize the pipe string weight required to move said valve means to open position.

8. Apparatus for use in drill stem testing comprising: tester means adapted for suspension in a well bore on a pipe string and including a member movable to open a valve in response to downward movement of the pipe string; means associated with said tester means for delaying opening of said valve, said delaying means being active only over a first portion of the total downward movement of the member required for opening said valve; and means coupled to said tester means and responsive to hydrostatic pressure of well fluids for applying upward force to said member only during a second portion of the total downward movement thereof required for opening said valve, whereby the downward movement of the pipe string to open said valve is opposed first by said delay means and then subsequently by said force applying means.

9. In a tool string for testing earth formations traversed by a well bore, said tool string being suspended on a pipe string and including tester means having a valve member which can be moved between open and closed conditions in response to upward and downward motions of the pipe string, the combination comprising: delay means for yieldably resisting downward movement of said valve member in order to delay opening thereof; and bias means coupled to said tester means for providing, in response to hydrostatic pressure of well fluids, downward force on parts of the tool string therebelow and upward force on said valve member, said delay means and bias means including parts relatively sized and arranged whereby the delaying effect of said delay means is terminated before said bias means exerts upward force on said tester means, thereby minimizing the total downward force which must be applied by the pipe string to the valve member in order to move it from closed to open condition.

10. In a well tool adapted for use in a fluid-filled well bore, valve means including first and second telescoping members arranged for relative movement between an expanded position in which the valve is closed and a contracted position in which the valve is opened, one of said telescoping members adapted to be connected to a string of pipe for longitudinal movement therewith, means for securing the other of said telescoping members against movement in a well bore, delay means in said valve means responsive to pressure exerted via a pipe string coupled to said first member for resisting movement of said first member toward said contracted position for a predetermined initial portion of the distance between the expanded and contracted positions, said valve means remaining closed during said initial portion, and bias means coupled to said valve means responsive to hydrostatic pressure of the fluid in said well bore and operable after the conclusion of said predetermined initial portion of said distance for opposing movement of said first member over the final portion of said distance to said contracted position, said valve being opened near the end of movement over said final portion.

11. Apparatus according to claim 10 wherein said bias means comprises a piston riding in a cylinder, said cylinder having an aperture for admission of well fluid under hydrostatic pressure, said piston having an extension adapted to engage said one of said telescoping members, and a surface subject to said well fluid pressure to urge said one of said telescoping members toward the expanded position, said cylinder being coupled to said other of said telescoping members and having a surface subject to said well fluid pressure exerted in a direction opposite to that exerted on said piston, said piston extension being of a length to be initially engaged by said one of said telescoping members only after movement of the latter over said predetermined portion of the distance between expanded and contracted positions.

12. Apparatus for use in drill stem testing, comprising: a tester valve having telescoping members one of which is movable relative to the other between an extended valve-closed position, a contracted valve-open position and an intermediate valve-closed position; means for delaying movement of said one member from said extended closed position toward said intermediate closed position, but not substantially impeding or delaying movement of said one member from said intermediate closed position to said contracted open position; and a bias assembly having means engageable with the said one member in substantially said intermediate position and responsive to hydrostatic well fluid pressures for exerting force on said one member to impede movement thereof from said intermediate closed position to said contracted open position.

13. Apparatus according to claim 12 further including at least one abutment means mounted on one of said members for rotation relative to both of said members; at least one abutment means on the other of said members; and index means cooperable between said first abutment means and one of said members for positioning said abutment means in engagement in said intermediate closed position whereby longitudinal force on one of said member can be transmitted to the other through said abutment means.

References Cited

UNITED STATES PATENTS

| | | | |
|---|---|---|---|
| 3,096,823 | 7/1963 | Crowe | 166—150 |
| 3,308,882 | 3/1967 | Lebourg | 166—150 X |
| 3,319,718 | 5/1967 | Graff | 166—150 |
| 3,329,209 | 7/1967 | Kisling | 166—150 X |

DAVID H. BROWN, Primary Examiner

U.S. Cl. X.R.

166—237